United States Patent
Bartley et al.

[11] Patent Number: 6,160,975
[45] Date of Patent: Dec. 12, 2000

[54] CLOSED LOOP RAMPING CONTROL AND METHOD OF FUSING TEMPERATURE, AND OPTIMIZING FIRST COPY TIME

[75] Inventors: Brian K. Bartley, Burgin; Steven J. Harris, Frankfort; Kevin D. Schoedinger, Nicholasville, all of Ky.

[73] Assignee: Lexmark International, Inc., Lexington, Ky.

[21] Appl. No.: 09/392,664

[22] Filed: Sep. 9, 1999

[51] Int. Cl.[7] .................................................. G03G 15/00
[52] U.S. Cl. ............................................. 399/69; 219/216
[58] Field of Search ................................ 399/44, 69, 70; 219/216

[56] References Cited

U.S. PATENT DOCUMENTS

| | | | |
|---|---|---|---|
| 4,385,826 | 5/1983 | Itoh | 399/70 |
| 4,681,423 | 7/1987 | Nishijima | 399/70 |
| 5,280,328 | 1/1994 | Goto et al. | 399/70 |
| 5,412,453 | 5/1995 | Matsuo | 399/67 X |
| 5,600,406 | 2/1997 | Aikawa et al. | 399/70 |
| 5,682,577 | 10/1997 | Kiyoi | 399/69 |
| 5,708,920 | 1/1998 | Ohnishi et al. | 399/69 |
| 5,729,789 | 3/1998 | Tamaki | 399/70 |
| 5,771,421 | 6/1998 | Kim | 399/44 |
| 5,789,723 | 8/1998 | Hirst | 219/216 X |
| 5,801,360 | 9/1998 | Oba et al. | 219/216 |
| 5,809,369 | 9/1998 | Fujruya et al. | 399/70 |
| 5,848,319 | 12/1998 | Morigami et al. | 399/22 |
| 5,854,957 | 12/1998 | Morikawa | 399/38 |
| 5,907,742 | 5/1999 | Johnson et al. | 399/69 X |

*Primary Examiner*—Fred L Braun
*Attorney, Agent, or Firm*—John A. Brady

[57] ABSTRACT

A system and method employing a control algorithm that implements a closed loop ramp up of fuser temperature by traversing an arc of discrete temperatures leading to the steady state temperature. Ramping is the transient period beginning when the fuser heater is turned on, to the time when the fuser reaches the desired steady state temperature.

18 Claims, 4 Drawing Sheets

CLOSED LOOP RAMPING CONTROL AND METHOD OF FUSING TEMPERATURE, AND OPTIMIZING FIRST COPY TIME

BACKGROUND OF THE INVENTION

1. Field of the Invention

The present invention relates to a system and method of closed loop ramping control of fusing temperature and optimization of the time to make a first copy. More particularly, the present invention relates to a system and method of controlling a printer so that print media arrives at the fuser just after the fuser achieves a desired target temperature.

2. Description of the Prior Art

The amount of time it takes for a job, sent from a host device to be printed, and to reach the printer's output bin is known as first copy time, and is an important feature to users of the printer. In conventional printers, the gate for first copy time, in electrophotographic printing, typically has been the amount of time it takes to warm the cold fuser to the temperature needed for fusing the image onto the print media. Such warmup time has been dramatically reduced by the use of a ceramic heating element within the fuser. However, the physical properties of the ceramic heating element are such that when it heats too quickly, the ceramic heating element is susceptible to cracking damage.

To achieve the best first copy time, the fuser must be heated as fast as possible without damaging the ceramic heating element. It is desirable to ramp up the temperature at a consistent rate, independent of line voltage, line frequency, and target temperature, in order to allow the control algorithm to predict the point in time when the fuser will reach the target temperature. Being able to predict the point at which the target temperature is achieved allows the control algorithm to begin feeding the print media at a point in time so that the print media reaches the fuser immediately after the fuser has achieved the desired target or steady state temperature. As a result, the application of any unnecessary energy to the fuser is prevented while the fuser is waiting for the print media to arrive.

Providing a consistent rate of temperature rise can be challenging due to the worldwide variations in line voltage and frequency. Line voltage for 110-volt machines can vary anywhere from 90VRMS to 139VRMS, for example, and the line frequency can be either 50 Hz or 60 HZ. Therefore, an open loop (no feedback control) ramping algorithm that provides a desirable rate of rise for one extreme line voltage condition will likely produce an undesirable rate of rise at the opposite extreme line voltage condition. Here open loop refers to a method of applying an input to the system (heat) and not using the output as a feedback for adjusting the level of the input.

In addition to line voltage extremes, open loop algorithms regulating heat to the fuser by adjusting the heat on time via AC half cycles are sensitive to line frequency. These routines must take into account that a 50 Hz half cycle produces a longer "on" time than a 60 Hz half cycle (10 ms and 8.33 ms, respectively). As a result, more power will be delivered to the fuser at 50 Hz for the same half cycle setting. Consequently, AC half cycle control algorithms must detect line frequency and perform some sort of line voltage measurement in order to find a suitable open loop ramping solution. If the line voltage detection is performed with hardware, there is a dollar cost involved. A software measurement of line voltage during ramp up would have to be conservative to prevent damage at high line voltage conditions, which would be detrimental to the first copy time of the printer. Therefore, a ramp without feedback, an open loop ramping algorithm, lacks the robustness to deliver a consistent rate of temperature rise in the fuser heater.

Similarly, a closed loop ramping algorithm alone, which tries to lock in on the desired, or steady state, temperature via feedback control, has deficiencies. In a closed loop control system the actual (temperature) is compared to the desired output of the system and is used as feedback to adjust the input accordingly. The rate of rise to the steady state temperature is determined by the gain constants in the control equation, which could be satisfactory for one line condition but not for another. However, one could use such a closed loop control method to track discrete temperature along an arc that leads up to the steady state temperature, rather than directly tracking the final steady state temperature. In this manner, the ramping arc follows in a piece-wise linear fashion, and the control algorithm can "snap to" the discrete target temperatures, thereby producing the desired consistent rate of rise. Achieving a robust, consistent fuser temperature ramp up will produce a consistent first copy time that is independent of the line voltage and the line frequency.

From the foregoing, it is an object of the present invention to provide a system and method of closed loop ramping control of fusing temperature such that the first copy time is minimized, yet the damage to the fuser from heating too quickly is minimized.

Another object of the present invention is to provide a system and method of closed loop ramping control of fusing temperature in which the best first copy time is achieved by heating the fuser as fast as possible without damaging the ceramic heating element. Heat rates less than 125 degrees Celsius/second have been found to be acceptable, but heating rates greater than 170 degrees Celsius/second will cause ceramic failure, i.e. cracking.

Yet another object of the present invention is to provide a system and method of closed loop ramping control of fusing temperature in which the temperature is ramped up at a consistent rate, independent of line voltage, line frequency, and target temperature, in order to allow the control algorithm to predict the point in time when the fuser will reach the target temperature.

Still another object of the present invention is to provide a system and method of closed loop ramping control of fusing temperature so that print media is fed so that the print media reaches the fuser immediately after the fuser has achieved the desired target or steady state temperature.

Another object of the present invention is to provide a system and method of closed loop ramping control of fusing temperature that tracks discrete temperature along an arc track leading up to a steady state temperature, instead of directly tracking a final steady state temperature, so that the ramping arc follows in a piece-wise linear fashion, thereby producing the desired consistent rate of rise, and thereby achieving a robust, consistent fuser temperature ramp up which will produce a consistent first copy time that is independent of the line voltage and the line frequency.

SUMMARY OF THE INVENTION

These and other deficiencies of the prior art are addressed by the present invention which is directed to a control algorithm that implements a closed loop ramp up of fuser temperature by traversing an arc of discrete temperatures leading to the steady state temperature. Ramping is defined here as the transient period beginning when the fuser heater is turned on, to the time when the fuser reaches the desired steady state temperature.

BRIEF DESCRIPTION OF THE DRAWINGS

These and other attributes of the present invention will be described with respect to the following drawings in which.

DETAILED DESCRIPTION OF THE INVENTION

The present invention is directed to a system and method that utilizes a control algorithm implementing a closed loop ramp up of fuser temperature by traversing an arc of discrete temperatures leading to the steady state temperature. Ramping is defined here as the transient period beginning when the fuser heater is turned on, to the time when the fuser reaches the desired steady state temperature.

Figure 1:
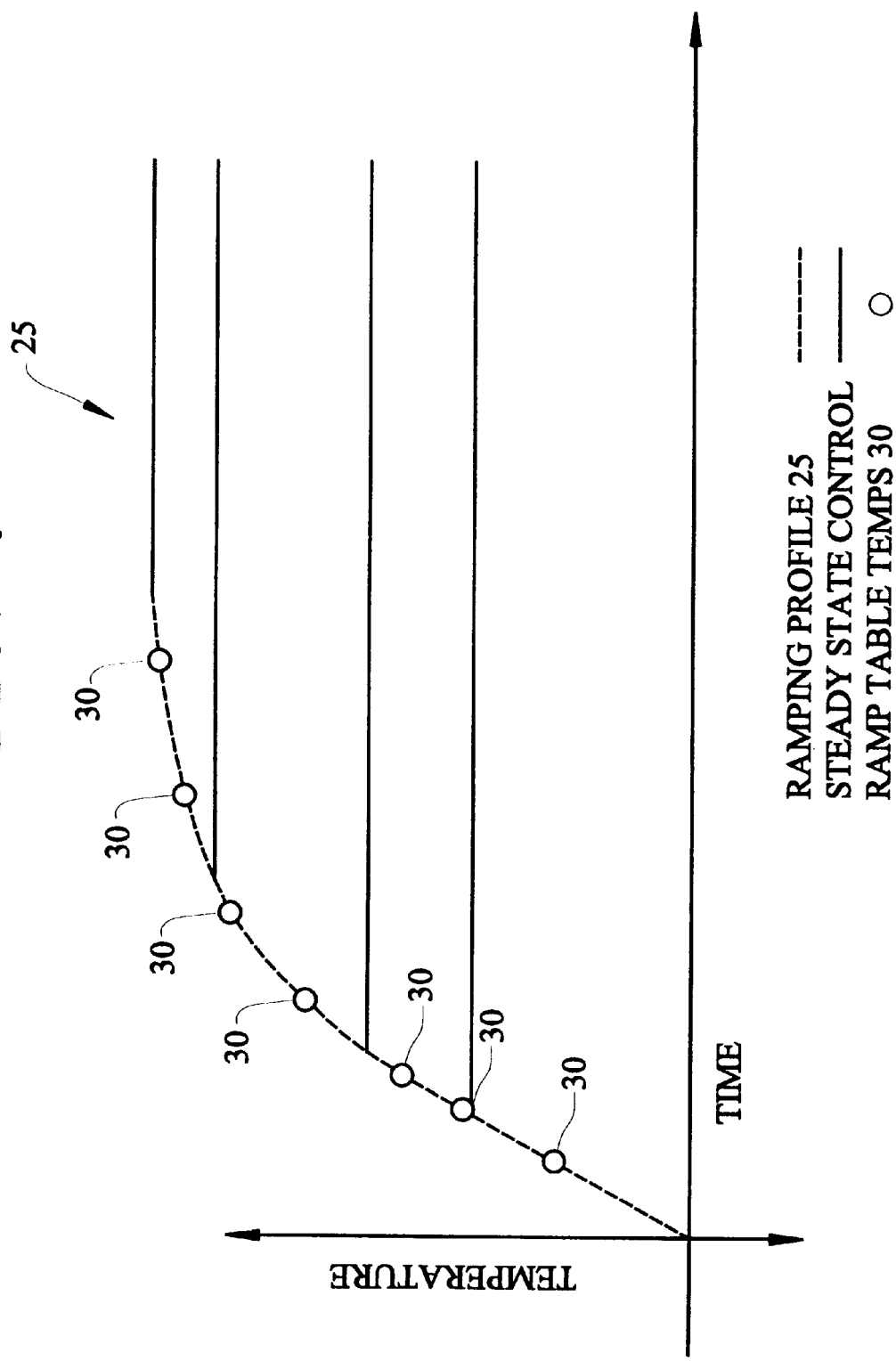
FIG. 1 is a graph of temperature verses time showing an arc formed from a plot of ramp up temperatures, according to the present invention.

Referring to FIG. 1, only one ramp profile 25 exists for the various steady state temperatures 30. This is due to the fact that the ramping control code can exit the ramp profile 25 from any point where it reaches the desired steady state temperature 30, regardless of the desired temperature. The steady state temperature to exit the ramp profile 25 may be selected based upon a type of media being employed and a speed of printing. In the same manner, the ramp table can be entered from any point. In other words, the control algorithm can begin ramping from a temperature in the arc 25 that corresponds to the current temperature.

In order to track the path of the ramping profile 25, a closed loop control method is employed to lock into each individual temperature 30 along the arc 25. At discrete time intervals (0.011 seconds in the illustrated embodiment), a pointer into the ramp table is incremented to point to the next target temperature in the table. The closed loop control algorithm then tracks to that target temperature until the next target temperature is set. The table is traversed in this manner until the fuser temperature nears the desired steady state temperature and at that point rolls the steady state control algorithm.

The closed loop portion of the control can be performed using various methods. One can use any combination of proportional, integral and/or derivative control. In the preferred embodiment, a combination of proportional, integral and derivative control is used to adjust the duty cycle of the heater conducting across an integer number of AC half cycles (or integer half cycle control). An integer half cycle is a method of turning on the heat for an integer number of the AC signal half cycles. In the present invention, for example, the heat could be set to turn on for 0, 1, 2 or 3 half cycles out of a possible 3 cycles. Likewise, the method of turning on the heater is not limited to just integer half cycle control. One can use full on/full off control, phase control or other methods for applying heat to the fuser. Phase delay control is a method of turning on the heat for a portion of the AC signal half cycles. A delay time is specified after the beginning of the half cycle to wait until the heat is turned on for the rest of the half cycle.

Figure 4:
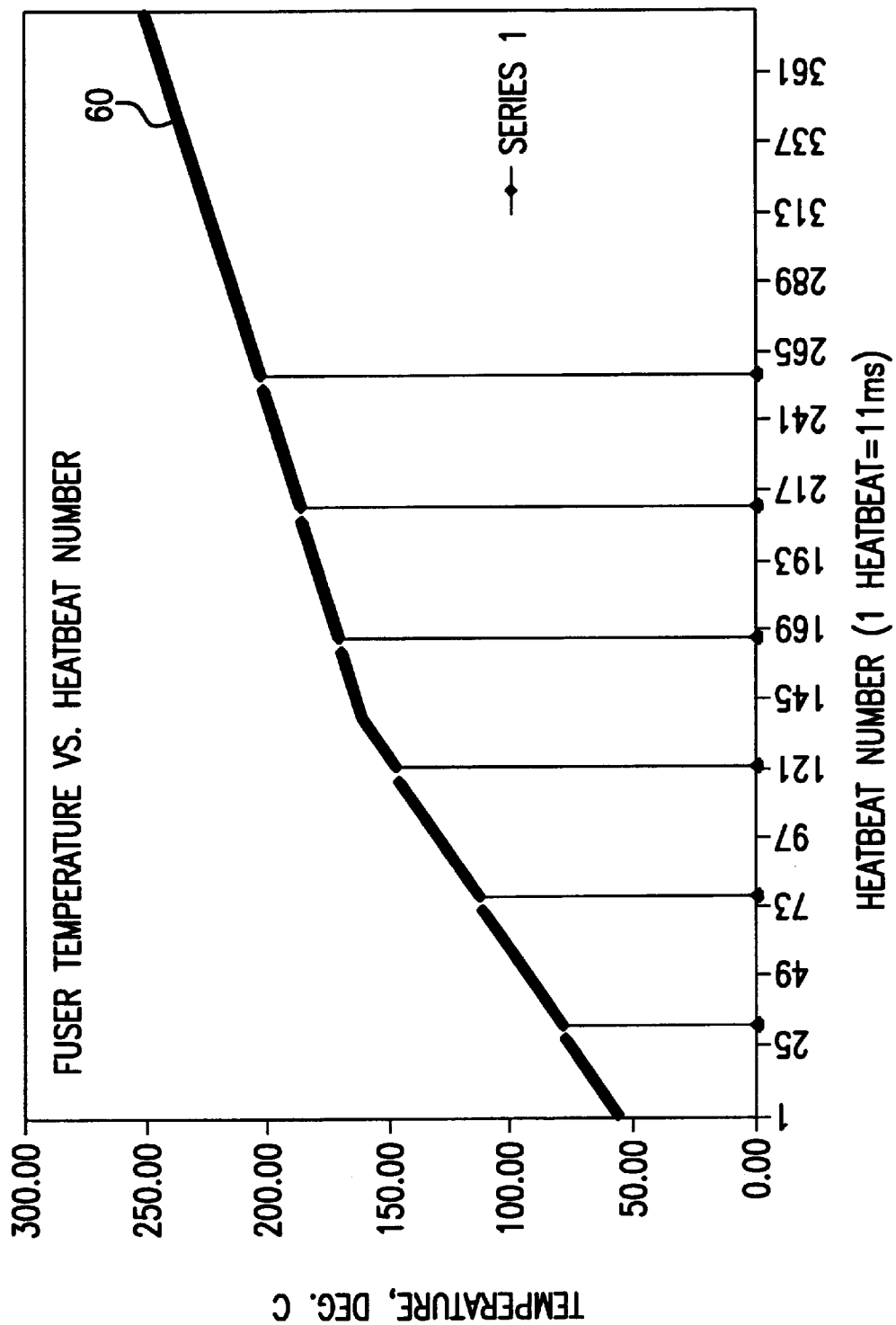
FIG. 4 is a graph of temperature verses time for a specific ramp profile according to the present invention.

Referring to FIG. 4, a specific ramp profile 60 is shown. The profile 60 encompasses a temperature range of approximately 50 degrees Celsius to 250 degrees Celsius. The horizontal axis shows time in increments of 11 ms. The fastest the ceramic heater may ramp up is approximately 125 degrees Celsius/second for many thousands of cycles. Ramp rates of greater than 170 degrees Celsius /second can cause failure such as cracking of the ceramic heater.

Figure 2:
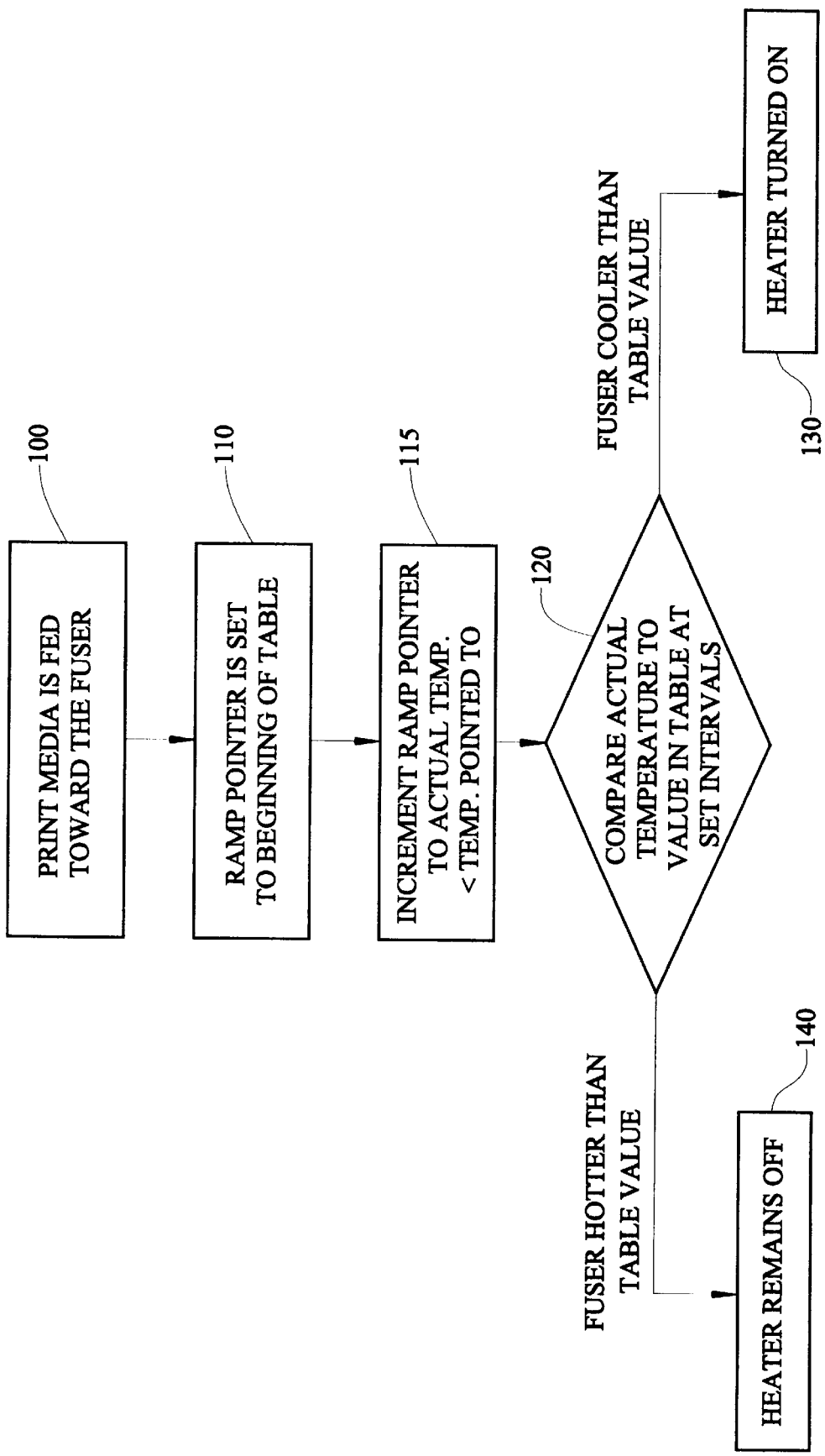
FIG. 2 is a flow chart of the method of the present invention.

The present invention takes advantage of the consistent temperature ramping properties of the foregoing algorithm to minimize thermal stress to the heater. The algorithm provides ramping profile so that a consistent amount of energy is applied to the system to achieve fuse grade, the amount of heating required to melt the toner into the print media. Referring to FIG. 2, in operation the following steps are performed:

First, reference 100, the print job comes down and the print media begins feeding toward the fuser;

Second, reference 110, the ramp pointer is set to a point on the ramping profile;

Third, reference 115, the temperature is sensed and the pointer is moved to the sensed temperature;

Fourth, reference 120, at each 0.011 second interval, the actual temperature of the fuser is compared to the value in the table for that particular interval. If the fuser is cooler than the value in the table, then the heater is turned on, reference 130, and it begins ramping from that point in the table, otherwise the fuser remains off, reference 140; and Last, reference 130, once the fuser is on, the fuser ramps up to the steady state temperature.

By employing the foregoing approach, the hotter fuser "cools into" the target temperature when the actual temperature is greater than the target temperature. This delays turning the heater on until actually necessary.

By defining the desired fuser temperature arc and breaking it up in a piece-wise linear fashion, a closed loop control, which tracks each discrete temperature, provides consistent, robust ramping features required by the printer system.

In particular, the printer system has a defined aggressive temperature ramp up with no risk of damage to the ceramic heater. The availability of consistent and predictable temperature ramp up permits the printer to turn the heater on only at the last moment necessary, and as a result the heater reaches steady state temperature just before the media reaches the fuser. The present invention is flexible enough for use with any closed loop control method and any type of fuser heating method. The robust ramping method delivers the characteristics mentioned above independent of the line voltage, line frequency, and steady state temperature. Consequently, the need for line frequency detection and line voltage measurement are eliminated. Furthermore, the robust ramping method of the present invention delivers consistent "first copy time" for a given temperature, independent of the line voltage and frequency.

The printer system of the present invention has the ability to scan the table to predict when the fuser will reach steady state temperature. As a result, the feeding of the print media can be staged so that it arrives at the fuser just as it reaches the desired temperature. However, the biggest advantage of the ramping system and method of the present invention is its robustness. The ramp table determines the fuser rate of rise. Therefore, the rate can be adjusted during the design stage, and it will follow this ramping profile regardless of the various line voltages and line frequencies found out in the field.

Figure 3:
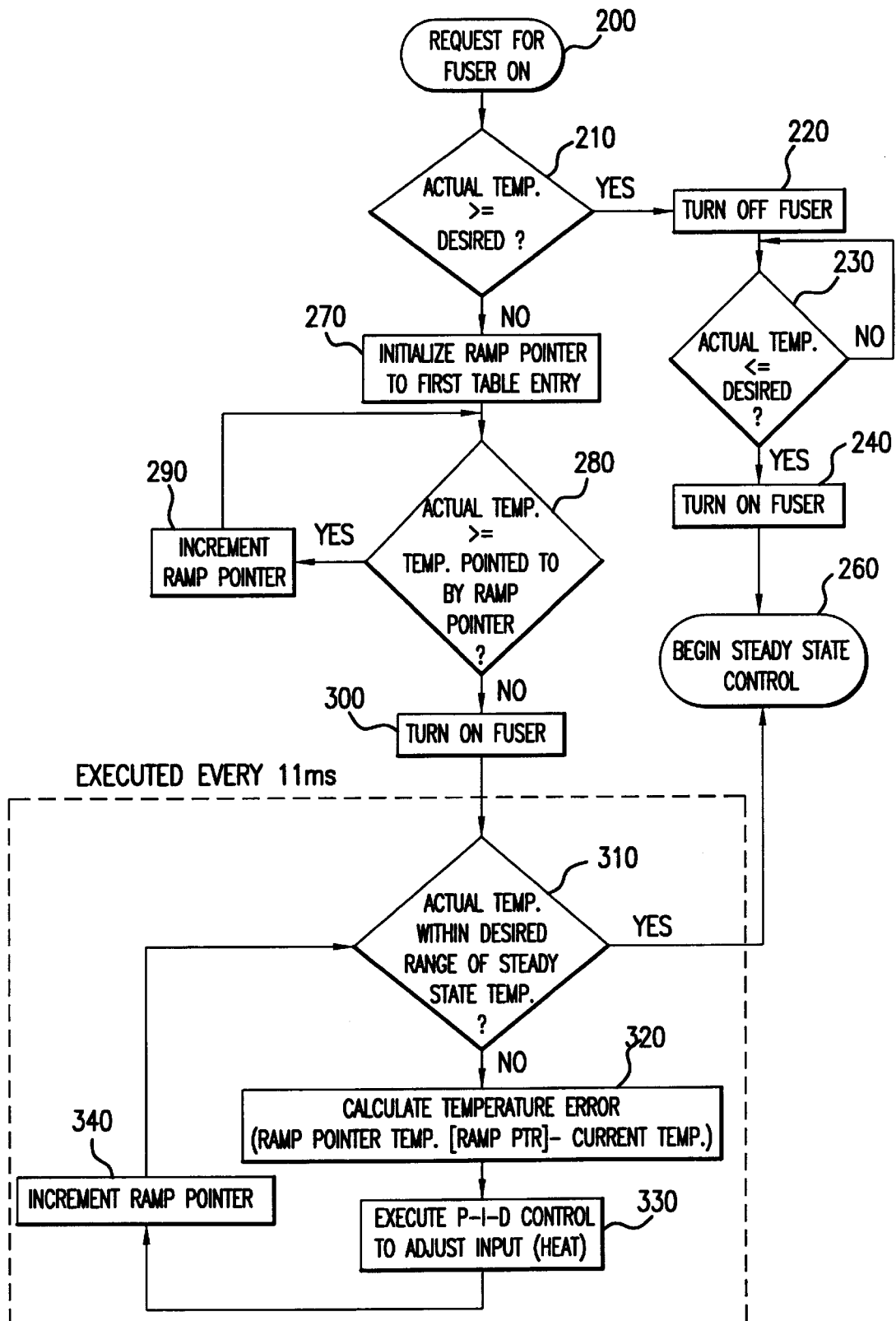
FIG. 3 is a more detailed flow chart of the operation of the present invention.

FIG. 3 is a more detailed flow chart of the operation of the present invention. The method starts, in step 200, by requesting the fuser be turned on. After the request, the actual temperature of the fuser is sensed and compared to the desired temperature in step 210. If the comparison of step 210 shows that the actual temperature is greater than or equal to the desired temperature, then the fuser is turned off in step 220. A second comparison is then made in step 230 to determine if the actual temperature is less than the desired temperature. Step 230 is repeated until the actual temperature of the fuser falls below the desired temperature. At that point the fuser is turned on in step 240 and steady state control begins in step 260.

If comparison step 210 is negative, meaning the actual temperature is less than the desired temperature, the ramp pointer is initialized to the first table entry in step 270. Next a comparison is made in step 280 to determine if the actual temperature is greater than or equal to the temperature pointed at by the ramp pointer. If yes then the ramp pointer is incremented to the next table entry in step 290. If the answer to step 280 is no then the fuser is turned on in step 300.

Subsequent to step 300, a comparison is made to determine if the actual temperature is within the desired range of steady state temperature, in step 310. If the result is positive then the system proceeds to step 260. If the result is negative, the temperature error is calculated, in step 320. Then P-I-D control is executed in step 330 to adjust the heat, and the ramp pointer is incremented again in step 340. After step 340, step 310 is repeated. Steps 310 through 340 are repeated until step 310 yields a positive result and step 260 is achieved. Steps 310–340 are executed every 11 ms.

An advantageous consequence of the present invention is that since the transition from one temperature to a higher temperature is predetermined, the gap between print media can be optimized and thereby maximize the throughput of the printer.

Having described several embodiments of the system and method that utilizes a control algorithm implementing a closed loop ramp up of fuser temperature by traversing an arc of discrete temperatures leading to the steady state temperature in accordance with the present invention, it is believed that other modifications, variations and changes will be suggested to those skilled in the art in view of the description set forth above. It is therefor to be understood that all such variations, modifications and changes are believed to fall within the scope of the invention as defined in the appended claims.

What is claimed is:

1. A method of controlling ramp up temperature of a heater in a fuser of a printer, comprising the steps of:
   providing a ramping profile for various steady state temperatures;
   controlling, by closed loop control, travel along said ramping profile, so as to lock into individual temperatures along an arc of said ramping profile;
   pointing to higher ones of said individual temperatures along said ramping profile at discrete time intervals;
   tracking each of said individual temperature along said ramping profile, by said closed loop control, until a next individual temperature is set; and
   running said heater at a steady state temperature when said individual temperatures near said steady state temperature.

2. A method of controlling ramp up temperature of a heater in a fuser of a printer, as recited in claim 1, wherein said closed loop control is performed using one of proportional control, integral control, derivative control, and a combination of proportional control, integral control, derivative control.

3. A method of controlling ramp up temperature of a heater in a fuser of a printer, as recited in claim 2, wherein said closed loop control is a combination of proportional, integral and derivative control, and is used to adjust a duty cycle of said heater conducting across an integer number of AC half cycles.

4. A method of controlling ramp up temperature of a heater in a fuser of a printer, as recited in claim 1, wherein said heater is turned on using one of full on/full off control and phase delay control.

5. A method of controlling ramp up temperature of a heater in a fuser of a printer, as recited in claim 1, wherein thermal stress to said fuser is minimized due to consistent temperature ramping properties of said ramping profile.

6. A method of controlling ramp up temperature of a heater in a fuser of a printer, as recited in claim 5, wherein an amount of energy applied to said heater at the start of a print job is limited by the further step of only turning on said heater when a temperature of said heater falls below said ramping profile.

7. A method of controlling ramp up temperature of a heater in a fuser of a printer, comprising the following steps:
   providing a ramping profile;
   feeding print media toward said fuser;
   sampling an actual temperature of said heater;
   setting a ramp pointer to a point on said ramping profile;
   comparing said actual temperature of said heater to a point on said ramping profile at set intervals;
   turning on said heater if a temperature of said fuser is less than said value on said ramping profile;
   maintaining said heater turned off when said temperature of said fuser is greater than said value on said ramping profile; and
   once said heater is on, said fuser ramps up following said profile to a steady state temperature.

8. A method of controlling ramp up temperature of a heater in a fuser of a printer, as recited in claim 7, wherein said point on said ramping profile is said steady state temperature.

9. A system for controlling ramp up temperature of a heater in a fuser of a printer, comprising:
   a table storing a fuser temperature ramping profile for various steady state temperatures;
   a controller for closed loop controlling travel along said ramping profile, so as to lock into individual temperatures along an arc of said ramping profile;
   said controller pointing to higher target temperatures along said ramping profile at discrete time intervals;
   said controller tracking each target temperature along said ramping profile, by said closed loop control, until a next target temperature is set; and
   said controller running said fuser at a steady state temperature when said ramping profile nears said steady state temperature.

10. A system for controlling ramp up temperature of a heater in a fuser of a printer, as recited in claim 9, wherein said controller controls running to each target temperature by one of proportional control, integral control, derivative control, and a combination of proportional control, integral control, derivative control.

11. A system for controlling ramp up temperature of a heater in a fuser of a printer, as recited in claim 10, wherein said controller controls running to each target temperature by a combination of proportional, integral and derivative control, and adjusts a duty cycle of said heater conducting across an integer number of AC half cycles.

12. A system for controlling ramp up temperature of a heater in a fuser of a printer, as recited in claim 9, wherein said controller controls turn on of said heater by using one of full on/full off control and phase delay control.

13. A system for controlling ramp up temperature of a heater in a fuser of a printer, as recited in claim 9, wherein said controller minimizes thermal stress to said heater by maintaining consistent temperature ramping properties of said ramping profile.

14. A system for controlling ramp up temperature of a heater in a fuser of a printer, as recited in claim 13, wherein an amount of energy applied to said fuser at the start of a print job is limited by said controller by turning on said heater when a temperature of said fuser falls below said ramping profile.

15. A system for controlling ramp up temperature of a heater in a fuser of a printer while print media is fed toward said fuser, comprising:
   a table storing a fuser temperature ramping profile;
   a controller setting a ramp pointer to a beginning of said ramping profile;
   said controller comparing an actual temperature of said fuser to a value on said ramping profile at set intervals;
   said controller turning on said heater if a temperature of said fuser is less than said value on said ramping profile, and incrementing a ramp pointer to ramp up from that point on said profile;
   said controller maintaining said fuser turned off when said temperature of said fuser is greater than said value on said ramping profile; and
   said controller ramping up said fuser to a steady state temperature once said fuser is on.

16. A method of optimizing first copy time by controlling ramp up temperature of a heater in a fuser of a printer, comprising the following steps:
   providing a ramping profile;
   feeding print media toward said fuser;
   setting a ramp pointer to a beginning of said ramping profile;
   comparing an actual temperature of said fuser to a value on said ramping profile at set intervals;
   turning on said heater if a temperature of said fuser is less than said value on said ramping profile, and ramping up from that point on said profile;
   maintaining said fuser turned off when said temperature of said fuser is greater than said value on said ramping profile;
   once said fuser is on, said fuser ramps up to a steady state temperature; and
   moving said print media adjacent said fuser to print on said print media, thus optimizing said first copy time.

17. A method of controlling ramp up temperature of a heater in a fuser of a printer, comprising the steps of:
   providing a single ramping profile reaching various steady state temperatures;
   selecting one of said steady state temperatures;
   controlling, by closed loop control, travel along said ramping profile, so as to lock into individual temperatures along an arc of said ramping profile;
   pointing to higher ones of said individual temperatures along said ramping profile at discrete time intervals, said individual temperatures being less than said selected one of said steady state temperatures;
   tracking each of said individual temperatures along said ramping profile, by said closed loop control, until a next individual temperature is set; and
   running said heater at said selected one of said steady state temperatures when said next individual temperature is near said selected one of said steady state temperatures.

18. A method of controlling ramp up temperature of a heater in a fuser of a printer, as recited in claim 17, wherein said one of said steady state temperatures is selected based upon a type of media being employed and a speed of printing.

* * * * *